United States Patent [19]
Tatsuno

[11] Patent Number: 5,268,892
[45] Date of Patent: Dec. 7, 1993

[54] COVER MEMBER FOR COVERING AN OPTICAL SYSTEM OF AN OPTICAL HEAD DEVICE INCLUDING A DUST FILTER MOUNTED IN AN OFF SET AIR FLOW OPENING

[75] Inventor: Toru Tatsuno, Fuchu, Japan

[73] Assignee: Canon Kabushiki Kaisha, Tokyo, Japan

[21] Appl. No.: 8,844

[22] Filed: Jan. 25, 1993

Related U.S. Application Data

[63] Continuation of Ser. No. 625,994, Dec. 12, 1990, abandoned.

Foreign Application Priority Data

Dec. 21, 1989 [JP] Japan ................................. 1-329685

[51] Int. Cl.$^5$ ............................................. G11B 7/12
[52] U.S. Cl. ........................... 369/112; 369/44.14; 369/44.17; 360/97.02; 360/129
[58] Field of Search ............. 369/44.11, 44.12, 44.14, 369/44.19, 44.17, 71, 72, 112, 292; 360/97.02, 98.01, 129

[56] References Cited

U.S. PATENT DOCUMENTS

| | | | |
|---|---|---|---|
| 4,006,294 | 2/1977 | Canino | 369/112 |
| 4,857,087 | 8/1989 | Bolton et al. | 360/98.01 |
| 4,958,336 | 9/1990 | Suzuki, et al. | 369/44.21 |
| 5,023,858 | 6/1991 | Nakayama | 369/112 |

Primary Examiner—Howard W. Britton
Assistant Examiner—Khoi Truong
Attorney, Agent, or Firm—Fitzpatrick, Cella, Harper & Scinto

[57] ABSTRACT

An optical head includes an objective lens for converging a light beam emitted from a light source onto a rotating recording medium, a carriage for holding the objective lens, a fine adjusting device for finely moving the carriage along an optical axis of the objective lens and/or a tracking direction and a movable head portion. The movable head portion is provided with a first opening facing the objective lens and a second opening connected to the first opening. The second opening is located off the optical path and has a dust filter mounted therein. Such a construction of the optical head prevents dust or the like from entering into the inside of the optical head due to the negative pressure generated upon rotation of the recording medium.

12 Claims, 4 Drawing Sheets

COVER MEMBER FOR COVERING AN OPTICAL SYSTEM OF AN OPTICAL HEAD DEVICE INCLUDING A DUST FILTER MOUNTED IN AN OFF SET AIR FLOW OPENING

This application is a continuation of prior application, Ser. No. 07/625,994 filed Dec. 12, 1990, now abandoned.

BACKGROUND OF THE INVENTION

1. Field of the Invention

The present invention relates to an optical head device applicable to a magneto-optical or optical information recording and reproducing apparatus.

2. Related Background Art

An optical head of this type uses an objective lens for irradiating a laser beam condensed to approximately 1 μm in diameter onto a surface of a disk-shaped recording medium, and a deflection mirror for deflecting the light beam to an optical path which guides the light beam from the semiconductor laser which serves as a light source to the objective lens. For example, as shown in FIGS. 1 and 2, the optical head device comprises an objective lens 6, an objective lens holding member 1 for holding the objective lens 6, adjusting means for finely moving the objective lens 6 along an optical axis of the objective lens and/or along a tracking direction for compensating for; and defocusing due to a plane vibration of a disk-shaped recording medium 17 and/or compensation for and change a positional error due to the eccentricity of the recording medium 17, and an optical system in optical head holding member (carriage) 4 to associate with the objective lens 6, a light source and a sensor through an optical path. The adjusting means comprises a focusing coil 8 and a tracking coil 9 arranged on an outer periphery of the objective lens holding member 1, permanent magnets 10a and 10b arranged to face the coils 8 and 9 and the optical head holding member 4, and electromagnetic yokes 11a and 11b. The optical system comprises a deflection mirror 12 as well as a beam splitter, a condenser lens, a photodetector and a semiconductor laser (all of which are not shown). In the present embodiment, the elements other than the objective lens 6 and the deflection mirror 12 are arranged on a fixed base which is separate from the optical head holding member 4 and they are linked to the deflection mirror 12 through an optical window. A cover 13 having an opening 21 formed at a portion facing the objective lens 6 is attached to the optical head holding member 4 and it covers an upper space between the objective lens 6 and the deflection mirror 12. Sliding bearing holes 14 and 15 for moving the optical head holding member 4 are formed in the optical head holding member 4 along the tracking direction 19. A guide rail (not shown) is inserted into the holes 14 and 15.

Such a prior art optical head device has the following problem. When the disk-shaped recording medium 17 is rotated in a direction 18 for recording or reproducing information, a negative pressure which sucks air into the opening 21 is created. External air flows into the optical head holding member 4 through the optical path window 16 or the bearing holes 14 and 15 and further into the cover 13 through the optical path window 22, and dust is carried in thereby. The dust is deposited the optical elements in the optical path. When dust deposits on the surface of the deflection mirror 12 or the objective lens 6, a light intensity to the recording medium in the recording or reproducing mode and a light intensity of the reflected light are adversely affected and correct writing and reading are impeded.

SUMMARY OF THE INVENTION

It is an object of the present invention to provide an optical head device which prevents the deposition of dust on optical elements in an optical path and always allows proper writing and reading.

The above object is achieved by an optical head system comprising an objective lens for converging a light beam emitted from a light source onto a recording medium, an objective lens holding member for holding the objective lens, fine drive means for finely driving the objective lens holding member along an optical axis of the objective lens and/or a tracking direction, and a movable member movable radially of the recording medium for carrying at least a portion of an optical system for coupling the objective lens, the light source and a sensor through an optical path. The movable member or a cover member therefor has a first opening facing the objective lens and a second opening connected to the first opening, and the second opening is located out of the optical path and is provided with a dust filter.

Details thereof will be explained in connection with an embodiment discussed hereinafter.

DETAILED DESCRIPTION OF THE PREFERRED EMBODIMENTS

An embodiment of the present invention is now explained in detail with reference to the drawings. The elements the same as those of the prior art are designated by like numerals and explanation thereof is omitted.

Figure 1:
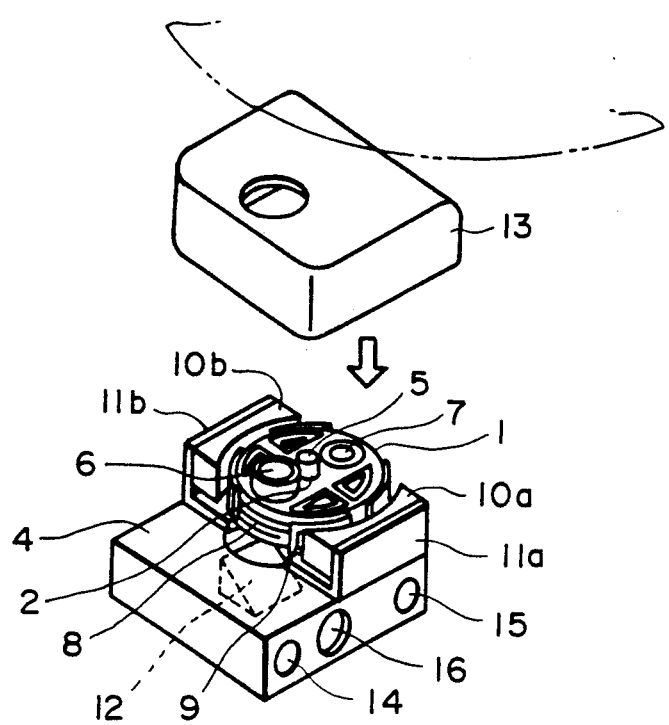
FIGS. 1 and 2 show perspective views of a prior art optical head device.
Figure 2:
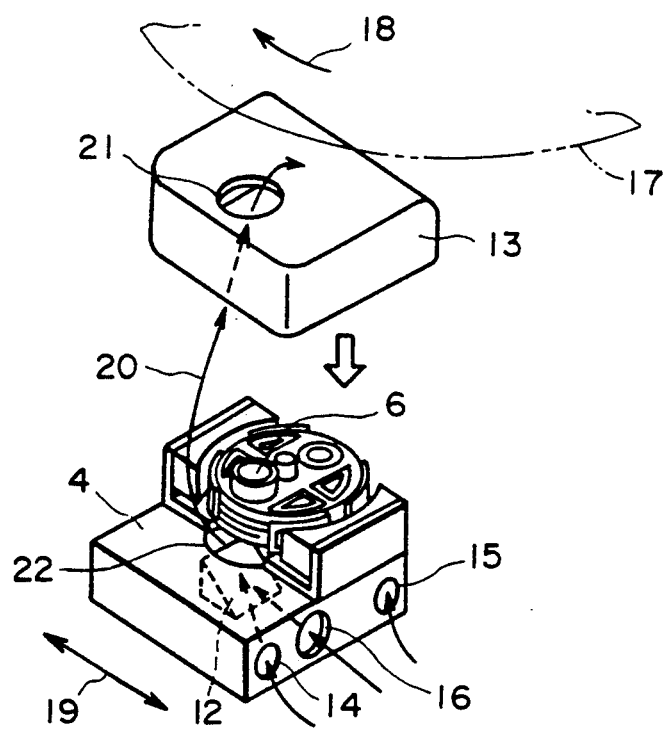
Figure 3:
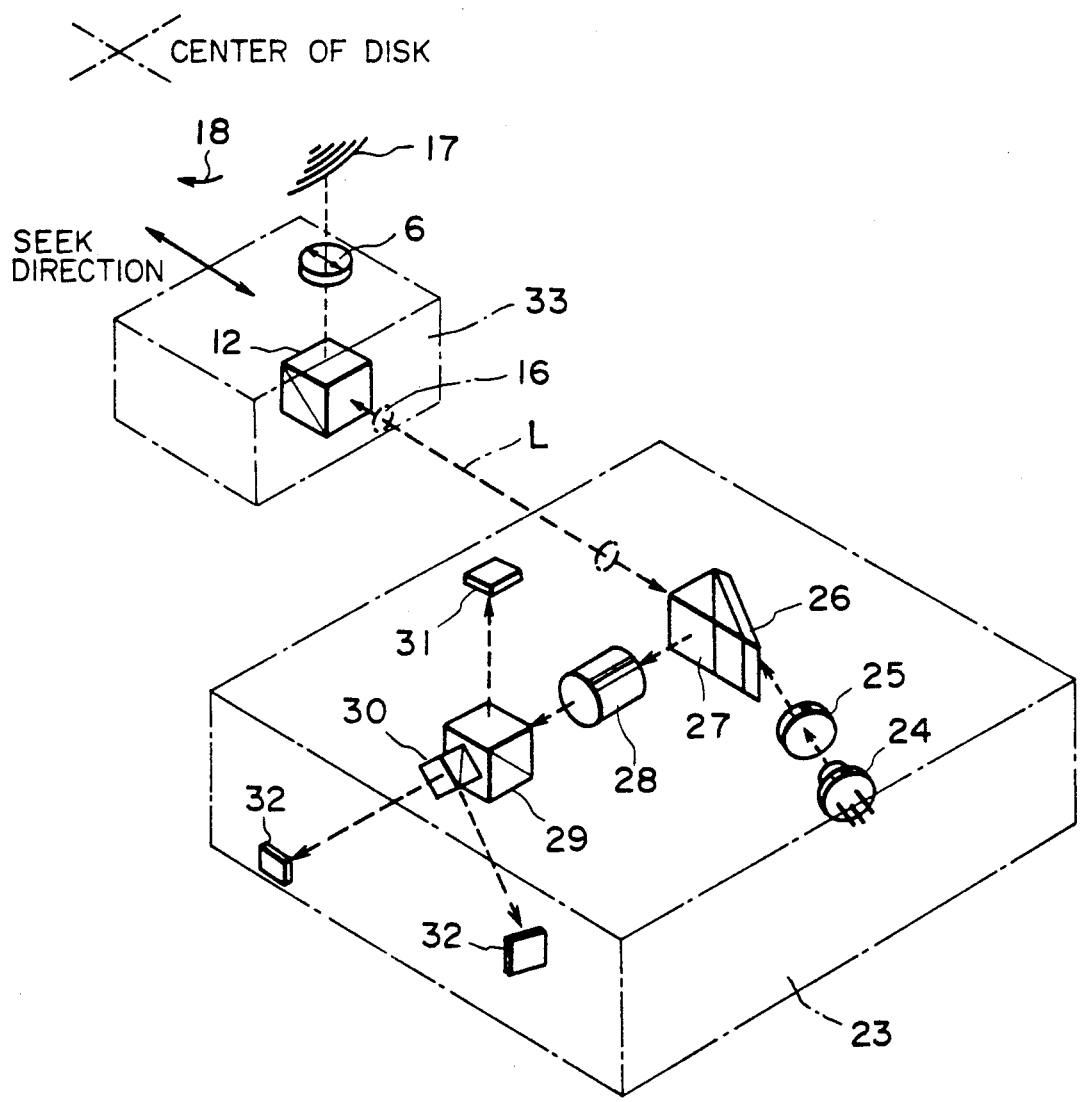
FIG. 3 shows an overall perspective view of a an optical head device of the present invention.

FIG. 3 shows an overall view of the optical head device of the present invention. Numeral 23 denotes a fixed head fixed to a device base. The fixed head 23 includes a light source 24 such as a semiconductor laser, a collimator lens 25, a beam reshaping prism 26, a first polarization beam splitter 27, a sensor lens 28, a second polarization beam splitter 29, a third polarization beam splitter 30, a servo sensor 31 and RF sensors 32.

Numeral 33 denotes a movable head which is movable relative to the fixed head 23 and movable radially of the optical disk 17, and L denotes an optical path of a laser beam emitted by the light source 24.

Figure 4:
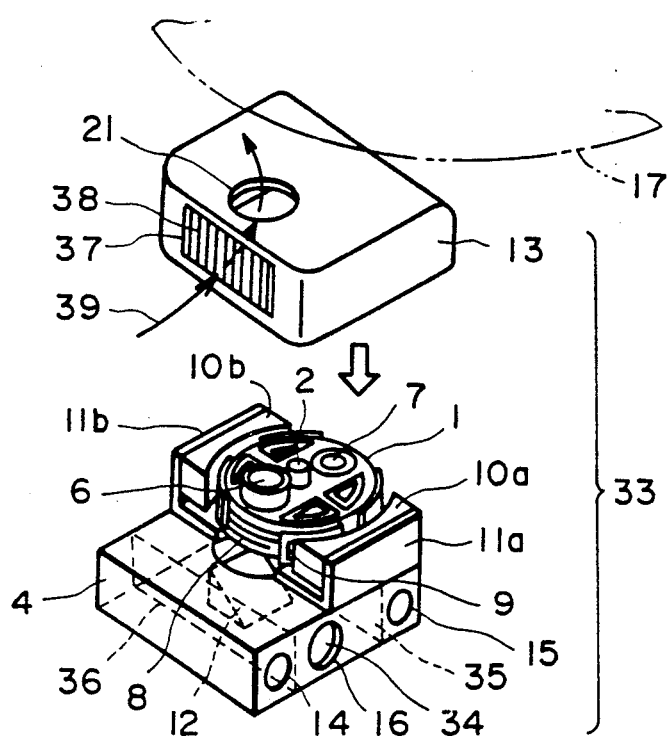
FIG. 4 shows a perspective view of detail of a movable head element 33 of FIG. 3.

FIG. 4 shows a detail of the movable head 33. Numeral 37 denotes an opening formed in a cover 13. Opening 37 is located at a different position than an opening 21 facing the objective lens 6 and out of the optical path of the laser beam. A filter 38 which has a small air resistance is mounted therein. A dust proof transparent glass 34 is fitted in the optical path window 16. When the device is operated, an air flow shown by arrow 39 is created by a negative pressure due to the rotation of the optical disk 17. If an air flow rate from the opening 37 is high, the air flow having a large flow resistance through the bearing holes 14 and 15 is substantially suppressed and external air flows through the filter 38 so that the entry of dust into the cover 13 is prevented and the entry of dust into the optical head holding member 4 such as the deflection mirror 12 is prevented. In order to more effectively prevent the entry of the air through the bearing holes 14 and 15, blocking walls 35 and 36 may be formed in the optical head holding member 4 at positions which are off the optical path.

Figure 5:
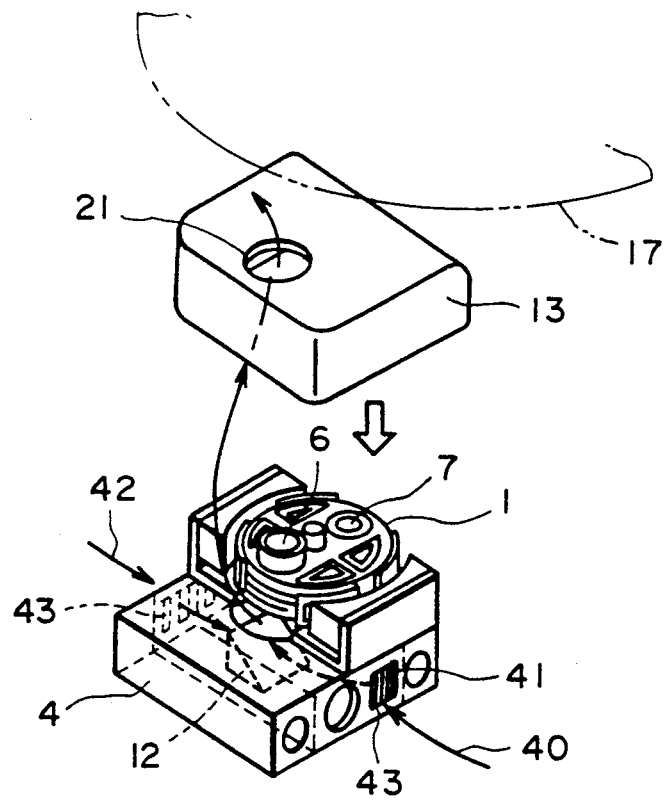
FIG. 5 shows a perspective view of an alternative of the movable head element 33 of FIG. 3.

FIG. 5 shows another embodiment of the movable head 33.

An opening 41 is formed adjacent to the optical path window 16, and a filter 43 is mounted therein. Like in the previous embodiment, a transparent glass 34 is fitted to the optical path window 16. Thus, when the device is operated, air flows as shown by arrows 40 and 42, and the air flows into the optical head holding member 4 or the cover 13 through the filter 43 so that the entry of dust is prevented.

In the present embodiment, only a portion of the optical system is mounted on the movable head 33 and another portion is mounted on the fixed head 23 to form a separated optical system. Alternatively, the present invention is also applicable to an optical head device having the entire optical system mounted on the movable head 33.

Figure 6:
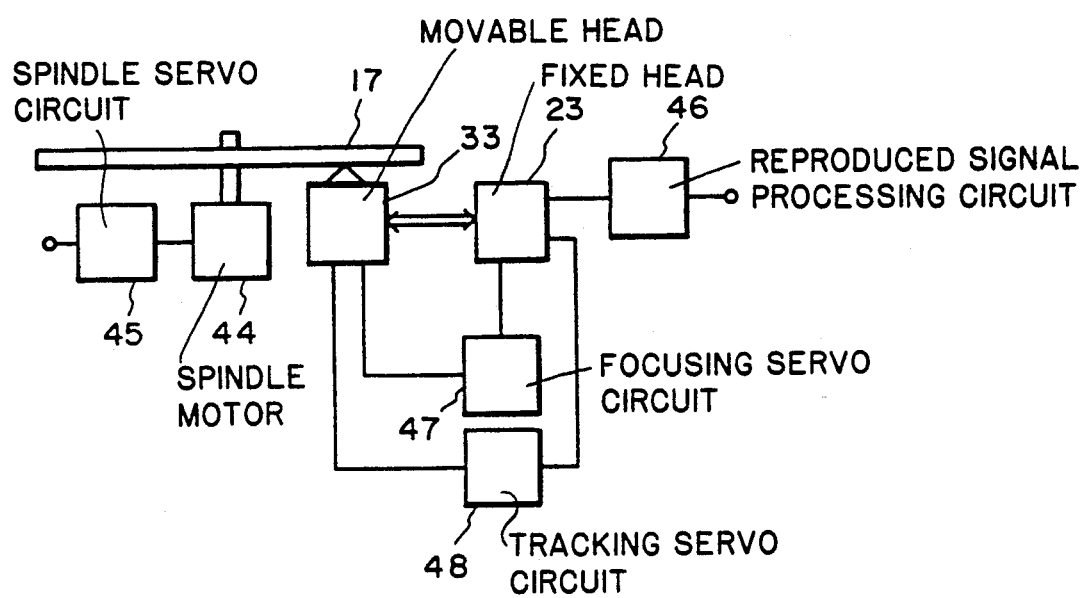
FIG. 6 shows a block diagram of an optical information recording and reproducing apparatus which uses the optical head device of the present invention.

FIG. 6 shows a block diagram of an optical information recording and reproducing apparatus to which the optical head device of the present invention is applied. Numeral 44 denotes a spindle motor for driving an optical disk 17, numeral 45 denotes a spindle servo circuit for controlling the spindle motor 44, numeral 46 denotes a reproduced signal processing circuit for processing a reproduced signal detected by an RF sensor 32 of the fixed head, and numerals 47 and 48 denote a focusing servo circuit and a tracking servo circuit, respectively, for driving the adjusting means in a focusing direction and a tracking direction, respectively, in accordance with servo error signals detected by servo sensors.

Operation of the optical head device of the present invention is now explained with reference to FIGS. 3 to 6.

When either a recording or reproducing command is issued by a host computer (not shown), the light source 24 is activated to emit a laser beam. The emitted laser beam is collimated by a collimator lens 25 and reshaped by a beam reshaping prism 26 and it is directed to the movable head 33 through the first polarization beam splitter 27. In the movable head 33, the laser beam from the fixed head 23 is deflected by the deflection mirror 12 and it is focused by the objective lens 6 and directed to the optical disk 17.

The movable head 33 accesses a target track by one of known seeking methods to record, reproduce or erase information. After it has reached the target track, the reflected light from the optical disk is detected by the servo sensor 31 through the objective lens 6, the deflection mirror 12, the first polarization beam splitter 27, the sensor lens 28 and the second polarization beam splitter 29, and the adjusting means is driven by the focusing servo circuit and the tracking servo circuit in accordance with the detected signal of the servo sensor 31 so that the laser beam is properly directed to the target track In the record mode, the laser beam is intensity-modulated by the recording information to form record pits which impart optical changes along the target track on the optical disk 17. In the reproduction mode, the reflected light which has been optically changed (intensity or Kerr effect) by the record pits is detected by the RF sensor 32 and the detected signal is processed by the reproduced signal processing circuit 46 to reproduce the information.

As described above, in the recording and reproducing modes, an air flow shown by arrows 39, 40 and 42 is created by a negative pressure due to the rotation of the optical disk 17. Since dust proof filters having a low air resistance are mounted in the openings 37 and 43, the entry of dust into the cover 13 or the optical head holding member 4 is prevented.

In accordance with the present invention, the opening is formed in the optical head holding member or the cover therefor at a position which is different from that of the opening for the objective lens and which is off the optical path of the laser beam, and the filter is mounted in the opening so that the air flows into and therethrough. Thus, the entry of dust is essentially prevented and recording and reproducing with a high reliability are attained.

What is claimed is:

1. An optical head device for an information recording and reproducing apparatus, said optical head device comprising:

an objective lens for converging a light beam emitted from a light source onto a rotating recording medium;

an objective lens holding member for holding said objective lens;

fine drive means for finely moving said objective lens holding member along at least one of an optical axis of the objective lens and a tracking direction;

a movable member movable radially of the recording medium for carrying at least a portion of an optical system for coupling said objective lens, said light source and a sensor through an optical path;

a cover member for covering said movable member, wherein said cover member has a first opening facing said objective lens and one of said movable member and said cover member have a second opening, for introducing an air flow created by rotation of the recording medium into said movable member, and wherein the second opening is located off the optical path; and a dust filter mounted in the second opening.

2. An optical head device according to claim 1, wherein said movable member comprises said light source and a plurality of sensors for detecting light reflected by the recording medium.

3. An optical head device according to claim 2, wherein said dust filter has a low air resistance.

4. An optical head device according to claim 1, further comprising a fixed member, not movable radially of the recording medium, and having mounted thereon said light source and a plurality of sensors for detecting a light beam reflected by the recording medium.

5. An optical head device according to claim 4, wherein said dust filter has a low air resistance.

6. An optical head device according to claim 1, where said movable member comprises a wall member for at least partially defining the optical path.

7. An optical information recording and/or reproducing apparatus for recording and/or reproducing information by a light beams, said apparatus comprising:

- a fixed member, not movable radially of a rotating recording medium, and having mounted thereon a light source for emitting the light beam and a plurality of sensors for detecting a light beam reflected by the medium;
- a movable member movable radially of the recording medium and comprising an objective lens for converging the light beam emitted from said light source onto the recording medium, an objective lens holding member for holding said objective lens, fine drive means for finely moving said objective lens holding means along at least one of an optical axis of said objective lens and a tracking direction and at least a portion of an optical system for coupling said objective lens, said light source and said sensors through an optical path;
- a cover member for covering said movable member, wherein said cover member has a first opening facing said objective lens and one of said movable member and said cover member have a second opening, for introducing an air flow created by rotation of the recording medium into said movable member, and wherein the second opening is located off the optical path; and
- a dust filter mounted in the second opening.

8. An optical information recording an/or reproducing apparatus according to claim 7, wherein said dust filter has a low air resistance.

9. An optical information recording and/or reproducing apparatus according to claim 7, wherein said movable member comprises a wall member for at least partially defining the optical path.

10. An optical information recording and/or reproducing apparatus for recording and/or reproducing information by a light beams, said apparatus comprising:

- a movable member movable radially of a rotating recording medium, said movable member comprising an objective lens for converging the light beam emitted from a light source onto the recording medium, an objective lens holding member for holding said objective lens, fine drive means for finely driving said objective lens holding member along at least one of an optical axis of said objective lens and a tracking direction, and at least a portion of an optical system for coupling said objective lens, said light source and a sensor through an optical path;
- a cover member for covering said movable member, wherein said cover member has a first opening facing said objective lens and one of said movable member and said cover member have a second opening, for introducing an air flow created by rotation of the recording medium into said movable member, and wherein the second opening is located off the optical path; and
- a dust filter mounted in the second opening.

11. An optical information recording and/or reproducing apparatus according to claim 10, wherein said dust filter has a low air resistance.

12. An optical information recording and/or reproducing apparatus according to claim 10, wherein said movable member comprises a wall member for at least partially defining the optical path.

* * * * *

UNITED STATES PATENT AND TRADEMARK OFFICE
CERTIFICATE OF CORRECTION

PATENT NO. : 5,268,892
DATED : December 7, 1993
INVENTOR(S) : TORU TATSUNO

It is certified that error appears in the above-indentified patent and that said Letters Patent is hereby corrected as shown below:

COLUMN 1:

Line 29, "for; and" should read --for--;
    Line 31, "compensation" should read --compensating-- and "and change" should be deleted;
    Line 60, "pressure" should read --pressure,--; and
    Line 61, "opening 21" should read --opening 21,--.

COLUMN 2:

Line 32, "a" should be deleted.

COLUMN 5:

Line 1, "beams," should read --beam,--; and
    Line 30, "an/or" should read --and/or--.

COLUMN 6:

Line 5, "beams," should read --beam,--.

Signed and Sealed this

Nineteenth Day of July, 1994

Attest:

BRUCE LEHMAN

*Attesting Officer*    *Commissioner of Patents and Trademarks*